June 1, 1926.
L. HAUBERT
1,586,675
POWER DELIVERING ATTACHMENT FOR MOTOR VEHICLES
Filed May 7, 1925  2 Sheets-Sheet 1
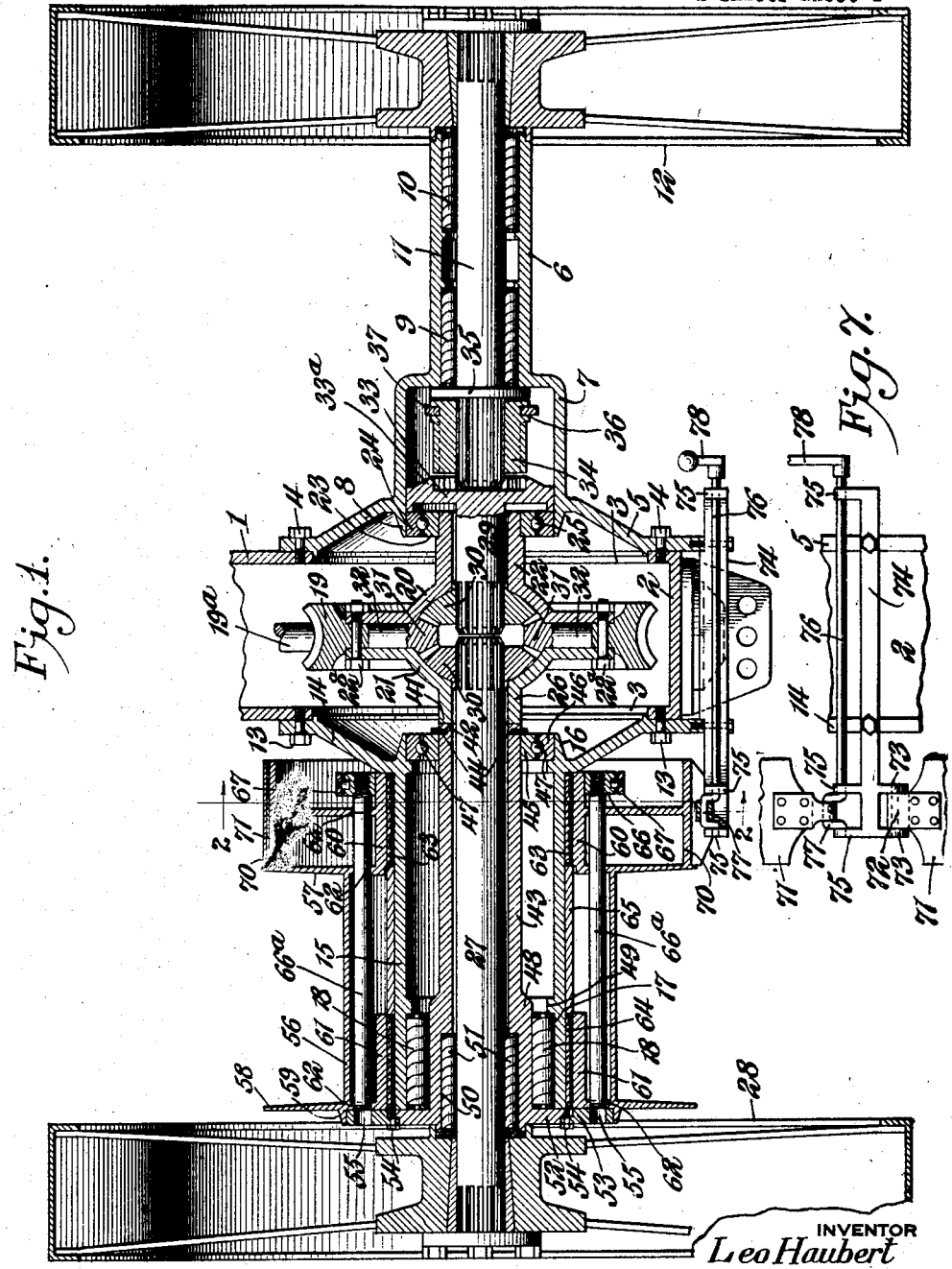
INVENTOR
Leo Haubert

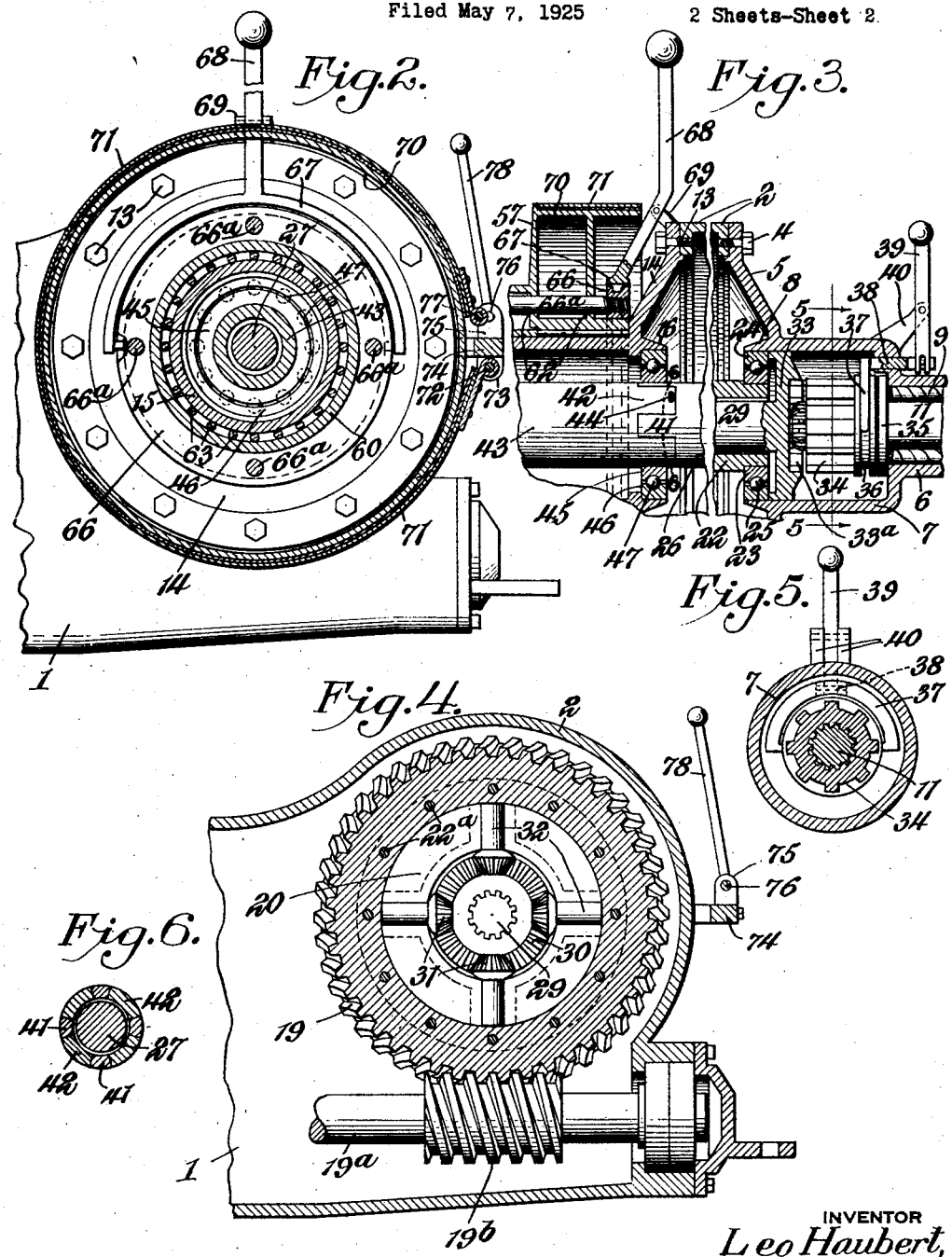

Patented June 1, 1926.

1,586,675

UNITED STATES PATENT OFFICE.

LEO HAUBERT, OF TULSA, OKLAHOMA, ASSIGNOR OF ONE-THIRD TO JOHN C. BENNETT AND ONE-THIRD TO JOHN A. WOLFE, BOTH OF TULSA, OKLAHOMA.

POWER-DELIVERING ATTACHMENT FOR MOTOR VEHICLES.

Application filed May 7, 1925. Serial No. 28,687.

This invention relates to improvements in power delivering attachments for motor vehicles, the structure herein shown, described and claimed being designed to improve and to simplify the construction of the power delivering attachment forming the subject matter of the application for patent, filed by me on November 14, 1924 and bearing Serial No. 749,915.

The principal object is to provide a more compact machine by the elimination of the outstanding, rearwardly projecting drum shaft and the arms or brackets for supporting the same together with the more or less bulky winding drum, brake drum and gear casing carried by said shaft, all of which interfere materially with the freedom of movement of the operator; and to simplify the construction and enable the manufacture of the same at a much reduced cost, by arranging the winding drum and brake drum in surrounding relation and concentric with one of the drive axles of the vehicle.

Another object is to provide means, especially adaptable to motor vehicles such as tractors, and located in such convenient position thereon, whereby the operator may readily divert the motive power of the tractor to cause the winding of a cable on the drum, either when the tractor wheels are turning, as when engaged in traveling or towing, or when the vehicle is standing still, simple controlling means being also incorporated which may be readily manipulated to enable the unwinding of the cable, as when lowering a load in a well, whether the vehicle is moving or standing, said drum being under the control of suitable brake mechanism, the controlling means for the tractor wheels, the winding drum and the brake mechanism being all within easy reach of the operator while seated on the machine or standing on the ground.

A final object is to provide a machine having the above characteristics and which may be manipulated to perform all the functions necessary without the use of any additional gearing of any kind, other than the usual differential gearing in common use in vehicles of the motor-driven kind, the power being taken directly from the differential for driving the drum, thus insuring the maximum power for hoisting purposes and eliminating the extra cost of such gearing.

A full and complete understanding of the invention may be obtained from a consideration of the following detailed description, taken in connection with the accompanying drawings forming a part of this specification, it being understood that while the drawings show a practical form of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:—

Figure 1 is a horizontal sectional view through the rear portion of a tractor having the power delivering attachment applied thereto in accordance with the present invention.

Figure 2 is a vertical section taken on the line 2—2 of Figure 1 and looking in the direction indicated by the arrows.

Figure 3 is a detail vertical section of the central portion of the machine and illustrating the hand-operated clutch means for the winding drum and the tractor wheels, the differential gearing being omitted in this view.

Figure 4 is a central, longitudinal section through the worm drive of the tractor.

Figure 5 is a detail, transverse section, taken on the line 5—5 of Figure 3.

Figure 6 is a detail transverse section, taken on the line 6—6 of Figure 3.

Figure 7 is a fragmentary elevation of the brake operating mechanism.

Referring to the drawings, there is shown a portion of the rear end of the usual tubular frame member or backbone 1 of a well known form of motor driven tractor, upon which are mounted certain parts of the machine (not shown), and which serves as the only connection between the front and rear wheels of the same.

An integrally formed ring or circular housing 2 is carried at the terminal of the backbone, thus providing, at either side, a relatively wide opening 3, which is provided with suitable inturned flanges having spaced apertures for the reception of fastening bolts for holding the axle housings in position in the usual manner, The right and the left hand axle housings in the present invention are differently formed that on the right being held in position on said ring 2 by the bolts 4 which traverse a peripheral flange forming part of a conical base member 5, the usual extended, tubular axle housing 6 being connected to said base 5 by an enlarged cylindrical chamber 7, formed integrally with both members, the inner end of said chamber having its wall extended inwardly beyond its juncture with the base to provide a seat 8.

The inner and outer ends of the tubular housing 6 are provided with roller bearings 9 and 10 respectively, in which is mounted the right hand axle 11 having the usual tractor wheel 12 keyed or otherwise secured thereto.

Secured to the other or left hand side of the ring 2 and in surrounding relation to the opening 3, by means of bolts 13, is the peripheral flange of a conical base member 14 formed integrally with an outwardly extending tubular bearing sleeve 15, which is of the same diameter as the aforesaid enlarged chamber 7, at the right hand side of the machine, and which extends out to close proximity to the left hand tractor wheel of the vehicle, the inner end of said bearing sleeve 15 extending inwardly beyond the point of juncture with the carrying base 14 to form another seat 16, the purposes of the aforesaid seats 8 and 16 being made clear later on in the description.

At its outer end the tubular bearing sleeve 15 is provided with a seat 17 for the reception of anti-friction rollers 18 which, like the aforesaid rollers 9 and 10 may be of a well known form in common use, wherein the individual rollers of each set are held in proper relation to each other by suitable cages so that the rollers are always held in proper longitudinal alinement with the axis of rotation.

Centrally mounted within the ring 2 and between the base members 5 and 14, which parts, collectively, constitute a differential housing, is a worm wheel 19 forming a part of the differential gearing, said wheel being adapted to be driven by a drive shaft 19ᵃ having a worm 19ᵇ mounted thereon and meshing with the wheel beneath the same, as shown in Figure 4 of the drawings.

At opposite sides of the wheel 19 there is secured face plates or members 20 and 21 respectively, held to the ring by bolts 22ᵃ, the right hand member 20 having a tubular extension 22 reaching to the aforesaid seat 8, and having a ball race 23 secured to its outer end for coaction with a similar ball race 24 held in said seat for the reception of antifriction balls 25.

The opposite member 21 is provided with a tubular extension 26 through which extends the left hand axle 27 carrying at its outer end the other or left hand tractor wheel 28 which, like the wheel 12, may be of any form of construction.

Extending through the right hand tubular extension 22 is a short shaft 29 which is located in exact axial alinement with the axles 11 and 27, the outer end of said shaft being in close relation to the inner end of the axle 11, which is thus considerably shorter than the axle 27, and the inner ends of the axle 27 and the shaft 29 are suitably slotted for the reception of differential gears 30 located between the face plates 20 and 21, and having the proper meshing relation with pinions 31 mounted on radially disposed spindles 32, suitably housed for independent rotation about their own axes within proper bearings formed in said members 20 and 21.

The outer end of the short shaft 29 is provided with a disc 33 arranged outside of the anti-friction bearing and having a bearing within the aforesaid chamber 7. The disc or head 33 constitutes one element of a clutch member, and is provided with an outstanding, annular flange 33ᵃ having internal teeth, into which is adapted to be moved the external teeth of a slidable block or clutch member 34 which is suitably splined on the inner end of the shorter right hand axle 11. The axle 11 is provided with an abutment flange 35 adapted to bear against the inner face of the end wall of the chamber 7 to prevent any outward movement of the axle 11 and which also serves as an abutment to limit the outward, sliding movement of the block or member 34.

The block 34, which is round in form, is provided near its outer end with a circumferential groove 36, in which there is suitably mounted the lower ends of a yoke 37 adapted to move longitudinally of the axle and connected to a centrally disposed rod 38 located at the top of the yoke and having a slidable bearing in the outer end wall of the chamber 7, the outer end of the rod having a suitable pin and slot conection with the lower end of an operating lever 39, standing upright on top of the axle housing and intermediately fulcrumed on the end of a supporting arm 40 connected to the top of the chamber 7. By manipulating the lever 39 in one direction or the other transversely of the vehicle, it will be seen that the axle 11 may be connected to or disconnecetd from the differential gearing through the short shaft 29.

The outer end of the tubular extension 26 of the differential casing at the left hand side of the machine is provided with terminal teeth 41 which are adapted to intermesh with similar teeth 42 formed in the inner end of a left hand axle housing 43, such connection causing the said housing to rotate at all times with the differential, as long as the motor shaft 19ª is rotating, and at the same time, said connection permits the extended axle housing 43 to be readily disconnected therefrom which is necessary in assembling the several parts of the machine. In order to prevent the housing 43 from sliding outwardly away from the differential, suitable pins or screws 44 are secured in the inner end of said housing 43, and the exposed portions of said pins are adapted to bear against the inner face of a ball race 45 loosely mounted on the housing, said race being adapted to coact with a complementary race member 46 secured in the aforesaid seat 16 and having antifriction balls 47 arranged between the said members. The outer end of the axle housing 43 is provided with an enlargement 48, which is adapted to form a bearing for the aforesaid rollers 18, and the inner face of the tubular sleeve or bearing member 15 is provided with an internal flange 49, which prevents the said rollers 18 together with their carrying cage from any inward movement.

The axle 43 is further provided at its outer end, with a counterbore 50, in which is located another set of anti-friction rollers 51 bearing upon the axle 27 which, at its inner end, finds support through the gear 30 within the differential.

At the outer end of the enlargement 48 of the axle housing 43, there is provided a disc or head 52, preferably formed integrally therewith, and having its peripheral edge rabbetted for the reception of an annular ring 53, the latter being held in position on the head by a series of circumferentially arranged bolts 54.

The ring 53 is provided with a plurality of holes 55, located adjacent to the outer periphery thereof for a purpose to be explained, and the said ring may be easily disconnected from the head 52 to facilitate assembling the parts of the machine.

Mounted to rotate on the bearing sleeve 15 is a winding drum 56 having an inner flange 57 and an outer flange 58, the said outer flange being provided with an annular flange 59 surrounding the periphery of the aforesaid ring 53.

The inner end of the drum is provided with an inner hub or bearing 60, and the outer end thereof has a similar head or bearing 61, and the inner drum head which connects the hub 60 thereto as well as the outer drum head are further provided with a series of alined openings 62, equal in number and in spacing to the aforesaid holes 55 in the rotating ring 53, and adapted to be alined with the same.

The hubs 60 and 61 are mounted on anti-friction rollers 63 and 64 respectively to permit the drum to freely rotate about the stationary supporting or bearing sleeve 15 carried by the vehicle casing, and the said roller bearings are prevented from sliding toward each other by a spacing sleeve 65 mounted around the sleeve 15.

On the extended inner end of the inner hub 60 there is adapted to slide a clutch ring 66, having an annular groove in the periphery thereof for the reception of pins carried by the lower ends of the arms of a yoke 67, having an upwardly extending, angularly disposed operating lever 68 pivotally mounted on an ear or ears 69 mounted on top of the casing.

The ring 66 carries elongated pins 66ª traversing the holes 62 in the drum heads, and the outer free ends of said pins are tapered to facilitate their entrance into the seats 55, so that when the hand lever 68 is properly shifted the winding drum is locked to the rotating differential and is caused to turn therewith.

The inner flange 57 of the drum carries a brake drum 70 at its outer edge, said brake drum extending inwardly toward the differential housing formed by the members 2, 5 and 14, and reinforced by a centrally disposed web joined to the inner hub 60. The inner edge of the brake drum is sufficiently spaced away from the central frame members of the tractor to permit of the operating lever 68 being freely operated.

A brake band 71 is mounted around the brake drum, the ends of the same being located at the rear of the machine, and the lower end thereof is provided with an eye 72 for a pin connection between depending ears 73 carried by a supporting bar 74, secured transversely of the machine and at the rear of the circular housing 2. The bar 74 is further provided with terminal, upstanding ears 75, in which there is pivotally mounted a crank shaft 76 having a crank 77 located near one end and in line with the brake band 71, the upper end of which is provided with an eye for suitable connection to said crank, the opposite end of the crank shaft having an upstanding operating lever 78 whereby, when the latter is manipulated to rock the shaft, the brake band is applied to the brake drum to retard the retrograde or unwinding movement of the winding drum after the pins 66ª have been withdrawn from their locking engagement with the holes 55, as when lowering a load at the end of a cable having connection with the winding drum.

When the shorter axle 11 and the short shaft 29 are properly connected together by the clutch elements 33 and 34, the power from the drive shaft 19ª will be distributed equally to both of the tractor wheels 12 and 28 by reason of the well known action of the differential gearing. When the axles are thus coupled to the differential, the axle housing 43 and the ring 53 are revolving together along with the said tractor wheels, and the machine is advancing along the ground. If the pins 66ª are retracted from the holes 55, the winding drum remains stationary but if, at times, it is desired to wind up a cable or rotate the drum for any other purpose while the machine is moving, it is only necessary to shift the lever 68 to project the pins into said holes, when said drum will rotate also. By simply shifting the block or clutch member 34 to disconnect the axle 11 from the short shaft 29, the machine will stand still, and the winding drum may be operated or not as desired, such winding operation usually taking place when the machine is stationary and very often anchored in position by any suitable means.

From the foregoing it will be seen that simple, strong and efficient means have been provided which may be easily incorporated in the structure of tractors or other motor vehicles without adding materially to the weight or bulk thereof, that the various controlling means are easily accessible from the driver's seat or while the latter is standing upon the ground and that the winding action may take place either when the machine is standing still or in transit, in either event the winding drum being readily disconnected and the load on the cable allowed to lower at the will of the operator, by means of the simple and convenient brake mechanism.

What is claimed is:—

1. In a power delivering attachment for motor vehicles, the combination of spaced axles carrying tractor wheels, differential gearing connecting said axles, a revoluble winding drum surrounding one of said axles in concentric relation thereto, said axles having housings, one of said housings being directly connected to the differential and extending through the winding drum, driving means carried by the outer end of the housing for coaction with the drum, and means for connecting the drum to said driving means.

2. In a power delivering attachment for motor vehicles, spaced axles having tractor wheels, differential gearing connecting said axles, axle housings surrounding the axles and connected to the differential, means for disconnecting one of the axles from said gearing to cause the vehicle to stand still, a revoluble winding drum surrounding the other axle in concentric relation thereto, a rigid sleeve carried by the differential housing and extending through the drum to revolubly support the latter, and means for connecting the drum to the adjacent axle housing to drive the drum either when the vehicle is standing or moving.

3. In a power delivering attachment for motor vehicles, the combination of spaced axles having tractor wheels, differential gearing connecting said axles, a revoluble drum surrounding one of the axles in concentric relation thereto, a bearing sleeve carried by the frame for supporting the said drum, and means located partially within the sleeve and within the drum for connecting the drum with the differential gearing to revolve therewith.

4. In a power driven attachment for motor vehicles, the combination of spaced alined axles provided with tractor wheels, differential gearing connecting said axles, a winding drum mounted in concentric relation to one of the axles, means carried by the frame for revolubly supporting the drum, means for connecting said drum to the differential gearing to drive the drum therefrom, said means being located in part in the supporting means and in part in the drum.

5. In a power delivering attachment for vehicles, the combination of spaced axles having tractor wheels, a frame, differential gearing connecting said axles, an outer stationary bearing sleeve carried by the frame and surrounding one of said axles concentric therewith, a winding drum revolubly mounted on said sleeve, an inner sleeve connected to the differential gearing to revolve therewith and arranged within the first-mentioned sleeve and surrounding said axle and means carried by the inner sleeve and the drum to cause the drum to be revolved with the inner sleeve.

6. In a power delivering attachment for motor vehicles, separate, spaced drive axles, differential gearing connected centrally of the vehicle to the inner end of one axle, means for driving the differential gearing, a short shaft connected at one end to the differential gearing and extending to the other axle, means for connecting the shaft and the last-named axle together to impart power to both axles, a winding drum concentric to and surrounding the first-named axle, an axle housing surrounding the axle extending through the drum and detachably connected at its inner end to the differential gearing, an end head carried by the axle housing and abutting the outer end of the drum, a ring secured to the head and having a series of holes, an outwardly extending sleeve carried by the differential housing and extending through the drum and abutting the head to revolubly mount the drum thereon, and a plurality of pins mounted in the drum and movable simultaneously in a longitudinal direction to enter said holes and lock the drum to the axle housing to be driven by the differential.

7. In a power delivering attachment for motor vehicles, the combination of spaced axles, one of the axles being shorter than the other, a short shaft interposed between the inner ends of the axles, a differential gearing connected to the long axle and the short shaft, clutch means for connecting or disconnecting the short shaft and the shorter axle, an outer stationary bearing sleeve carried by the frame and concentrically surrounding the longer axle, a winding drum revolubly mounted on the bearing sleeve, an inner sleeve connected to the differential gearing to revolve therewith and surrounding the longer axle within the bearing sleeve, and means connecting the drum and the inner sleeve so as to cause the drum to be revolved therewith.

8. In a power delivering attachment for motor vehicles having spaced alined axles, one axle being longer than the other, a short shaft interposed between the inner ends of the axles, the said shaft and the longer axle being connected at their inner ends to power-driven differential gearing, clutch means for connecting or disconnecting the shaft and the shorter axle, an outer stationary bearing sleeve carried by the frame of the vehicle and concentrically surrounding the longer axle, a winding drum revolubly mounted on the bearing sleeve, an inner sleeve connected to the differential gearing to revolve therewith and surrounding the longer axle, a circular head formed on the outer end of the inner sleeve and carrying seats, pins mounted for longitudinal movement in the drum, and means for sliding the pins into the said seats to lock the drum to the differential gearing for winding a cable on said drum.

9. In a power delivering attachment for motor vehicles having separate alined drive axles, one axle being longer than the other and directly connected to centrally located power-driven differential gearing, a short shaft connected to the other side of the differential gearing and alining with the shorter axle, means for connecting or disconnecting the short shaft and axle, an inner sleeve extension detachably connected to and adapted to rotate with the differential gearing and surrounding the longer axle, anti-friction bearings located at the outer end of the sleeve for said axle, a radial disc or head carried by the outer end of the sleeve, a ring removably secured to the periphery of said head to revolve therewith and having spaced openings or seats, a stationary outer bearing sleeve detachably secured to and carried by the frame of the vehicle and abutting at its outer end against said disc or head, a winding drum mounted to rotate on said outer sleeve, inner and outer anti-friction bearings mounted between the hubs of the drum and the outer sleeve, said drum having heads provided with alined apertures adapted to register with the said openings or seats in the revolving ring, a slidable clutch ring mounted on the inner hub of the drum, a hand lever for shifting said ring, and a series of pins carried by said ring and tranversing the apertures in the drum heads and adapted to be projected into said seats to rotate the drum for winding a cable thereon.

In testimony, that I claim the foregoing as my own, I have hereto affixed my signature.

LEO HAUBERT.